Patented May 15, 1928.

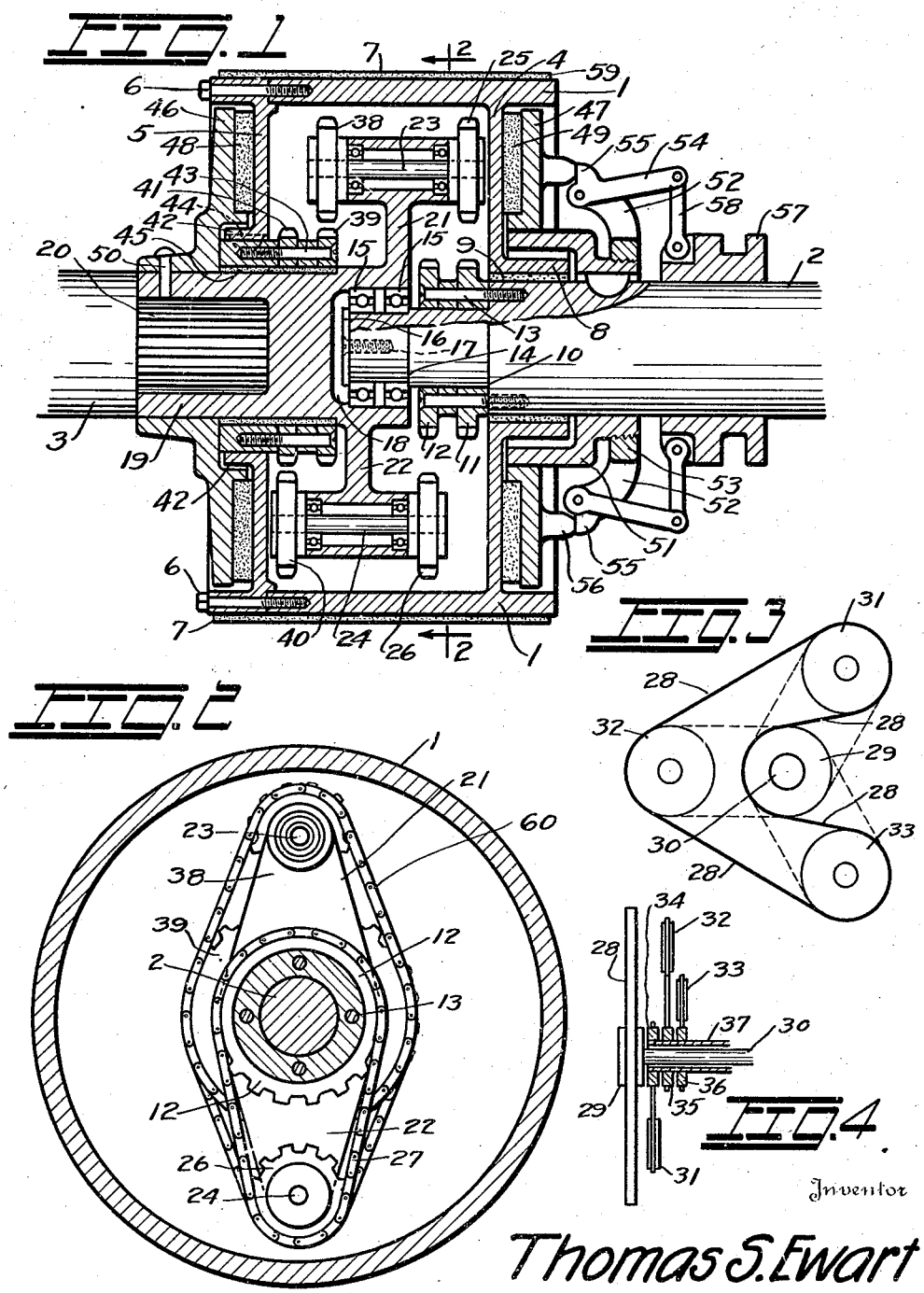

1,670,144

UNITED STATES PATENT OFFICE.

THOMAS S. EWART, OF RAYMOND, WASHINGTON.

REVERSE DRIVE.

Application filed March 8, 1926. Serial No. 92,998.

The invention is a reverse drive employing roller chains and sprockets as the operating medium.

The object of the invention is to provide a connection in a shaft which will normally permit the shaft to rotate as a unit, and which may be readily adjusted to cause one portion of the shaft to rotate in a direction that is opposite to that of the other.

Another object of the invention is to provide a means for readily reversing the direction in which a shaft is rotating, which will operate with a high degree of efficiency.

A further object of the invention is to provide a reverse drive in which the speed ratio in the device may be readily changed by varying the diameter of the sprockets.

A further object of the invention is to provide a reverse drive in which all the parts are standard so that they may readily be replaced.

A still further object of the invention is to provide a reverse drive in which the parts may readily be changed to provide greater or lesser strength.

And a still further object of the invention is to provide a reverse drive which is of a simple and economical construction.

With these ends in view the invention embodies a cylindrical housing, shafts penetrating each end of said housing, the end of one shaft being rotatably mounted in the end of the other, sprockets on one of the said shafts, arms extending outward from the end of the other of the said shafts, sprockets at the outer ends of the said arms, stationary sprockets on the interior of the said housing, roller chains connecting the said sprockets at the ends of the arms to the said stationary sprockets, and also to the sprockets on the end of the said shaft, and means for clamping and holding the said housing.

Other features and advantages of the invention will appear from the following description taken in connection with the drawings, wherein:

Figure 1 is a longitudinal section through the device.

Figure 2 is a cross section on line 2—2 of Figure 1.

Figure 3 is a diagrammatic view showing an alternate arrangement of the driving sprockets.

Figure 4 is a side view of the device shown in Figure 3 showing the relative positions of the sprockets.

In the drawings the device is shown as it would be made wherein numeral 1 indicates the housing, numeral 2 the drive shaft and numeral 3 the driven shaft.

The housing 1 is made as shown with a cylindrical outer shell and a web 4 adjacent one end. At the opposite end is a similar web which is indicated by the numeral 5 and which is held to the casing 1 by bolts 6 through a flange 7 at the periphery of the web.

The web 4 is provided with a hub 8 in which the shaft 2 is rotatably mounted through a bearing 9. At the inside of the bearing the shaft is recessed as shown at the point 10 and on the recessed part are two sprockets 11 and 12 which are held to the shaft by bolts 13 as shown, and beyond this portion the shaft is again recessed as shown at the point 14 and bearings 15 are mounted upon it, which are held in place by a washer 16 and a screw 17. The bearings 15 are mounted in an opening 18 in a sleeve 19 which is splined to the inner end of the shaft 3 as shown at the point 20.

The sleeve 19 is provided with outwardly extending arms 21 and 22 which have sprockets rotatably mounted on spindles 23 and 24 at their outer ends. It will be noted that one sprocket which is indicated by the numeral 25, at the outer end of the arm 21 is in line with the sprocket 11 so that a roller chain may pass around the two sprockets, and another sprocket 26 at the outer end of the arm 22 is in line with the sprocket 12 so that a roller chain as indicated by the numeral 27, may pass around it. It is also understood that the member 19 may be provided with any number of arms having similar sprockets at the outer ends, and as many sprockets will be placed upon the shaft 2 as there are arms so that the sprocket at the outer end of each arm will be independently driven.

It is also understood that all of the sprockets at the outer ends of the arms may be in line as shown in Figures 3 and 4, and a continuous chain as indicated by the numeral 28 may pass around them as shown. In this design a sprocket 29 is placed on the main drive shaft which is indicated by the numeral 30, and other sprockets 31, 32 and 33 are placed at the outer ends of the arms so that a continuous chain 28 will engage all of the sprockets and as the sprocket 29 is rotated it will cause the sprockets 31, 32 and 33 to rotate also. The sprockets 31, 32 and 33 are connected by individual chains to other sprockets 34, 35 and 36 on a tubular shaft 37, as shown in Figure 4, and it will be observed that as the shaft 30 is rotated and the sprockets 31, 32 and 33 supported on the arms of a spider as shown in Figure 1, the tubular shaft 37 will be rotated in the opposite direction. The positions of the sprockets 31, 32 and 33 are distorted and their supporting arms omitted in Figure 4 for the purpose of illustration.

At the opposite ends of the arms 21 and 22 are other sprockets which are connected by chains to stationary sprockets in the housing. At the end of the arm 21 is a sprocket 38 which is in line with a sprocket 39 and at the end of the arm 22 is a sprocket 40 that is in line with a sprocket 41 so that as chains are placed over the sprockets 38 and 39 and also over the sprockets 40 and 41 the stationary sprockets 39 and 41 will hold the chains and cause the arms 21 and 22 to rotate the member 19 in a direction opposite to that of the shaft 2. The sprockets 39 and 41 are held to a ring 42 by bolts 43 and the ring 42 is keyed to a hub at the center of the web 5 by a key 44, as shown in dotted lines. The sprockets 39 and 41 are mounted upon a bearing 45 in a recess in the outer surface of the member 19.

At the ends of the housing 1 are brake rings 46 and 47 having friction rings 48 and 49 recessed therein. The ring 46 is rigidly attached to the member 19 and held by a pin 50 as shown and the ring 47 is slidable on a member 51 which has arms 52 screwed on its outer end through a ring 53. Levers 54 are pivotally attached to the outer ends of the arms 52 and these are provided with projections 55 which engage a projection 56 on the ring 47. The levers 54 are operated through a sliding sleeve 57 to which they are attached by levers 58. The sleeve 57 may readily be moved to operate the clutch in any desired manner.

On the outer surface of the housing 1 is a brake band 59 which may also be arranged and operated in any suitable manner to hold the housing rigid to a frame in which the device may be mounted when it is desired to use the reverse, as it will be observed that when the clutch holds the housing so that it will rotate with the shaft, the shaft 3 will rotate in the same direction as the shaft 2 and when the clutch is released and the housing held by the brake band 59 the reverse drive will operate to rotate the shaft 3 in the opposite direction.

It is understood that changes may be made in the construction without departing from the spirit of the invention. One of which changes may be in the design or arrangement of the housing, another may be in the arrangement of the sprockets or chains, and still another may be in the use of a different type of clutch mechanism.

The construction will be readily understood from the foregoing description. To use the device it may be arranged and assembled as shown, and it will be observed that as the driving shaft 2 is rotated it will in turn rotate the sprockets on the arms 21 and 22 and as the sprockets on the other ends of these arms are held by the stationary sprockets on the housing through chains 50, the arms will be forced to rotate in a direction opposite to that of the shaft 2 so that the member 19 and the shaft 3 will also rotate in the opposite direction. It will also be noted that by changing the ratio of the sprockets it will be possible to change the speeds between the two shafts so that the shaft 3 may travel at the same speed in reverse as it does forward or it may travel at a greater or lesser speed. It will also be noted that when it is desired to drive both shafts in the same direction the clutch may be operated to grip both ends of the housing so that both of these shafts and the housing will rotate at the same speed; while at the same time it will be possible to readily release the clutch and grip the housing by the brake band to reverse the direction of the shaft 3.

Having thus fully described the invention what I claim as new and desire to secure by Letters Patent, is:

1. In a device for changing the direction of a portion of a rotating shaft, a cylindrical housing, a driving shaft having one end journaled in the said housing, a driven shaft, also having one end journaled in the said housing, a member with outstanding arms attached to the end of the said driven shaft, sprockets in the outer ends of the said outstanding arms, other sprockets on the said driving shaft, other sprockets stationary in the said housing, roller chains passing around the said sprockets on the said outstanding arms, and the sprockets on the said drive shaft and also the said stationary sprockets, a suitable clutch apparatus for rigidly holding the said housing to the ends of both of the said shafts, and other means for holding the said housing stationary.

2. In an apparatus for reversing a portion of a shaft, a drive shaft, a driven shaft, sprockets on the end of the said drive shaft, other sprockets on the ends of shafts rotatably mounted and remotely held in outstanding arms from the said driven shaft chains connecting the sprockets on the drive shaft with the sprockets in the outstanding arms, other sprockets on the other ends of the rotatably mounted shafts in the outstanding arms, and other stationary sprockets, said sprockets being connected by suitable roller chains to the latter sprockets on shafts in the outstanding arms, and said stationary sprockets being attached to suitable means for holding them stationary.

3. In a device for reversing the direction of a portion of a shaft, a sprocket on the drive portion of the said shaft, other sprockets freely and remotely held in outstanding arms from the said driven portion of the shaft, another sprocket fixedly mounted in relation to the said shaft and suitable chains connecting some of the said sprockets in the outstanding arms to the sprocket on the drive portion of the shaft and some to the fixedly mounted sprocket.

4. In a reverse drive mechanism, a drum shaped housing, a drive shaft journaled in one end of the said housing, a driven shaft journaled in the opposite end of the said housing and abutting the said drive shaft, means on both of the said shafts for frictionally gripping the ends of the said housing to cause the said housing and shafts to rotate as a unit, other means for holding the housing stationary while the said shafts rotate, outstanding arms at the end of the said driven shaft, sprockets rotatably mounted in the said arms, other sprockets on the end of the said drive shaft chains connecting these sprockets to the sprockets in the said arms, other sprockets fixedly mounted in the said housing, and other chains connecting the fixedly mounted sprockets to the other sprockets in the outstanding arms.

5. In a reverse drive mechanism, a drive shaft, a driven shaft, abutting the end of the said drive shaft, a drum shaped housing surrounding the said abutment, frictional means on each of the said shafts for gripping the ends of the said housing, other means for holding the housing stationary while the said shafts rotate, a sleeve in the said housing splined to the said driven shaft, said sleeve having outwardly projecting arms, sprockets rotatably mounted in the outer ends of the said arms, other sprockets on the said drive shaft for rotating certain of the said sprockets on the said arms, other sprockets stationary in the said housing for holding certain of the said sprockets on the said arms and suitable chains connecting the said sprockets.

6. In a reverse drive mechanism, a housing, a drive shaft journaled in the said housing, a driven shaft abutting the end of the said drive shaft and also journaled in the said housing, a clutch mechanism comprising friction discs engaging the external surfaces of the ends of the housing with one disc held on the said driven shaft and the other on the said drive shaft, a brake operating on the outer surface of the said housing for holding the housing stationary, transmission means on the end of the said drive shaft, a spider with outstanding arms on the end of the said driven shaft, transmission means at the ends of the said arms cooperating with the transmission means on the said drive shaft and other transmission means stationary in the said housing cooperating with the said transmission means at the ends of the said arms.

7. In a reverse drive mechanism, a cylindrical housing, a drive shaft entering the said housing from one end and journaled in the center of the end thereof, a driven shaft with outstanding arms in the said housing journaled in the said housing and on the end of the said drive shaft and entering the said housing from the end opposite to that of the drive shaft, shafts rotatably mounted in the outer ends of the said arms of the said driven shaft, rotatable means connecting the said shafts to the said drive shaft, other rotatable means connecting the said shafts to a stationary device within the said housing, clutch mechanism comprising friction discs mounted on the said drive and driven shafts and engaging the ends of the said housing and a suitable brake mechanism engaging the cylindrical surface of the said housing.

8. In a reverse drive of the class described, a drum shaped housing, a drive shaft entering one end of the said housing and journaled therein, a driven shaft entering the opposite end of the said housing and journaled therein, means for holding the said housing to rotate as a unit with the said drive and driven shafts, other means for holding the said housing stationary, outstanding arms in the said housing and fixedly attached to the said driven shaft, sprockets rotatably mounted in the outer ends of the said arms, other sprockets on the end of the said drive shaft and adaptable to cooperate with the sprockets in the arms through chains, other sprockets fixedly attached to the said housing, and also adaptable to cooperate with the sprockets at the ends of the said arms and suitable chains connecting the said sprockets.

9. In a reverse drive of the class described, a drum shaped housing, a drive shaft entering one end of the said housing and journaled therein, a driven shaft entering the opposite end of the said housing and journaled therein, outstanding arms in the said housing and fixedly attached to the said driven shaft, sprockets rotatably mounted in the outer ends of the said arms, other sprockets on the end of the said drive shaft and adaptable to cooperate with the sprockets in the arms through chains, other sprockets fixedly attached to the said housing, and also adaptable to cooperate with the sprockets at the ends of the said arms through chains, a clutch mechanism engaging both ends of the said housing to cause the said housing to rotate with the said shafts as a unit, and a brake band around the said housing to hold the housing stationary.

10. In a reverse drive of the class described, a drum shaped housing, a drive shaft entering one end of the said housing and journaled therein, a driven shaft entering the opposite end of the said housing and journaled therein, outstanding arms in the said housing and fixedly attached to the said driven shaft, sprockets rotatably mounted in the outer ends of the said arms, other sprockets on the end of the said drive shaft and adaptable to cooperate with the sprockets in the arms through chains, other sprockets fixedly attached to the said housing, and also adaptable to cooperate with the sprockets at the ends of the said arms through chains, means for gripping and holding the said housing; and a clutch mechanism engaging both ends of the said housing to cause the said housing to rotate with the said shafts as a unit.

In testimony whereof he affixes his signature.

THOMAS S. EWART.